United States Patent Office 3,170,939
Patented Feb. 23, 1965

3,170,939
CARBOXYLATED DERIVATIVES OF OLEYL ALCOHOL AND METHOD FOR THEIR PRODUCTION
Edward T. Roe, Chalfont, and Daniel Swern, Philadelphia, Pa., assignors to the United States of America as represented by the Secretary of Agriculture
No Drawing. Original application June 20, 1960, Ser. No. 37,533. Divided and this application Jan. 22, 1962, Ser. No. 176,473
4 Claims. (Cl. 260—413)
(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This application is a division of S.N. 37,533, filed June 20, 1960, now abandoned.

This invention relates to carboxylation of long chain unsaturated fatty compounds and has among its objects the carboxylation of long carbon chain olefinic compounds with carbon monoxide at atmospheric pressure.

In accordance with this invention, direct carboxylation of long chain olefinic compounds with carbon monoxide can be achieved at atmospheric pressure by employing a narrow range of operating conditions in which the concentration of the sulfuric acid and also the molar ratio of sulfuric acid to the long chain olefinic compound must be regulated.

According to the present process carbon monoxide at atmospheric pressure is (a) dispersed in aqueous sulfuric acid having a concentration in the range of about 93 to 98% $H_2SO_4$, (b) the olefinic compound is combined with this sulfuric acid at about 10–20° C. in such proportions that the resulting mixture contains at least about three moles water to each mole of olefinic compound, and (c) during the mixing of olefinic compound and sulfuric acid additional carbon monoxide is dispersed in the mixture. The entire operation is conducted at substantially atmospheric pressure, and the new carboxylic acid derivative is recovered from the sulfuric acid by dilution with water and solvent extraction or mechanical separation.

The product is typically recovered from the reaction mixture by pouring the sulfuric acid solution into a mixture of ice and water, followed by extraction of the product with a suitable solvent such as ether. Alternatively, procedures for extracting the product directly from the reaction mixture may be employed.

A critical variable in the high yield atmospheric carboxylation of the less reactive, long carbon chain non-terminally unsaturated compounds is the concentration and quality of water. The importance of water is quite evident, as shown in Table I, in which the results of the carboxylation of oleic acid are tabulated. In all of these examples the amount of water does not change during carboxylation, since the carbon monoxide is generated externally. The following equation summarizes the chemistry involved:

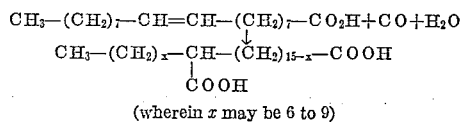

(wherein $x$ may be 6 to 9)

Commercial oleic acid was purified by crystallization at low temperature followed by fractional distillation to give the oleic acid employed as the starting material in these examples.

The present invention is illustrated with particular reference to Example 6 (Table I):

Carbon monoxide was passed through 80.4 g. (0.795 mole) of 97.2% sulfuric acid contained in a 500-ml. three-neck flask, vented to the atmosphere, using a gas dispersion tube with a coarse fritted cylinder. With stirring, 7.1 g. (0.025 mole) of oleic acid was added dropwise in 16 minutes to the sulfuric acid solution which was saturated with carbon monoxide. Carbon monoxide was allowed to pass through the stirred mixture for a total of two hours, while the temperature was maintained between 9 and 13° C. with external cooling. At the end of this time the mixture was poured into approximately 300 ml. of a mixture of ice and water. The product was extracted with ether and washed free of sulfuric acid. The ether solution was dried over anhydrous sodium sulfate, filtered, and the ether was then evaporated, yielding 6.4 g. of pale yellow syrupy material having an iodine number of 12.9, acid number, 300, and saponification number, 300.

The reaction conditions for the other examples were the same as described for Example 6 with the exceptions listed in Table I, specifically, mole ratio of sulfuric acid to oleic acid, concentration of sulfuric acid, and time of stirring the mixture.

TABLE I.—REACTION OF OLEIC ACID WITH GASEOUS CARBON MONOXIDE

| Ex. No. | Mole Ratio | | | Sulfuric acid, percent | Time, hrs. | Acid Number [b] | Iodine Number |
|---|---|---|---|---|---|---|---|
| | Oleic acid | Sulfuric acid | Water [a] | | | | |
| 1 | 1 | 5.5 | 3.0 | 91 | 2 | [c] 150 | 18 |
| 2 | 1 | 9.6 | 1.5 | 97 | 2 | 222 | |
| 3 | 1 | 9.6 | 1.5 | 97 | 6 | 226 | |
| 4 | 1 | 18.0 | 2.8 | 97 | 1 | 252 | 34 |
| 5 | 1 | 19.1 | 3.0 | 97 | 2 | 287 | 20 |
| 6 | 1 | 31.8 | 5.0 | 97 | 2 | 300 | 13 |
| 7 | 1 | 63.6 | 10.0 | 97 | 2 | 297 | 16 |
| 8 | 1 | 24.0 | 0 | 100 | 2 | [d] 215 | 63 |

[a] Water present in sulfuric acid.
[b] Saponification number essentially the same as acid number, except where given below.
[c] Saponification number 201.
[d] Saponification number 251.

Referring to Examples 1 to 8, the extent of carboxylation is indicated by an increase in acid number and a decrease in iodine number. With 91% sulfuric acid (Example 1) no carboxylation takes place. The acid number actually indicates a loss of carboxyl group. Since the same mole ratio of water, three moles of water to one mole of oleic acid, when contained in a more concentrated sulfuric acid (Example 5) is adequate, one must conclude that 91% sulfuric acid is too dilute for this process.

On the other hand, 1.5 mole of water per mole of oleic acid is insufficient for caboxylation to proceed in a satisfactory manner (Examples 2 and 3) even though the concentration of sulfuric acid is 97% and the reaction time is extended to six hours. With 100% sulfuric acid (Example 8) carboxylation, if occurring, is negligible, showing conclusively that water must be present during the reaction.

The greatest increase in acid number and decrease in iodine number, indicating maximum carboxylation, is obtained when five moles of water per mole of oleic acid is employed (Example 6.) Increasing the amount of water above five moles per mole of oleic acid (Example 7) or increasing the reaction time beyond two hours does not increase the amount of carboxylation.

The product obtained by the carboxylation of oleic acid, the pale yellow viscous liquid described in Example 6, could not be purified by low temperature solvent crystallization, but distilled readily at about 200° C. and 0.45 mm. mercury pressure to give a product having an acid number of 341, carbon and hydrogen analyses of 69.4 and 11.7%, respectively, and molecular refractivity of 92.8. These and other data obtained for the product are included in Table III. Infrared spectra and gas chromatographic analyses of the product were also obtained. All the data substantiate the conclusion that the product is carboxystearic acid of the Formula I.

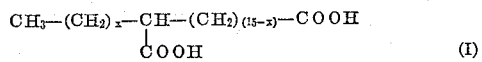

(I)

In a major portion of the product, the carboxyl group in probably in the 9 or 10 position ($x=7$ or 8). However, in view of the nature of strong acid-catalyzed double bond addition reactions, the 8 and 11 isomers ($x=6$ or 9) are also formed.

The source of carbon monoxide may be other than that already illustrated. For example it may be generated in situ by the decomposition of formic acid in the sulfuric acid reaction medium, but the composition of the reaction mixture must still adhere to the concentration of sulfuric acid and mole ratio of water to compound to be carboxylated must be approximately as defined by Examples 5 and 6.

Highly purified oleyl alcohol (98–99%), methyl ricinoleate and linoleic acid were also carboxylated by the process of the present invention. After pouring the reaction product obtained by carboxylation of oleyl alcohol into an ice and water mixture, it was necessary to hydrolyze the sulfate ester by boiling. Otherwise the procedure was substantially that employed in Example 6.

Table II shows the high recovery of typical crude reaction products and the extent to which they are carboxylated by comparing the acid number of the product with that calculated.

the acid number; with methyl ricinoleate and linoleic acid, however, the saponification number is quite different from the acid number. This suggests that an ester or lactone has formed in the latter two instances. Also, the hydroxyl value of the product obtained from methyl ricinoleate is much lower than would be expected. The significance of these points will be discussed later in more detail.

In all of the preparations except that of the oleic acid derivative, it was desirable to convert the crude reaction products to methyl esters before purification by distillation.

The usual method of direct esterification does not completely esterify the branched carboxyl group. Using dimethyl sulfate, as illustrated in the following example, nearly complete esterification is obtained after 42 hours reflux.

*Example 13.—Preparation of the dimethyl ester of carboxystearic acid*

A distilled fraction from the product of carboxylation of oleic acid was used as starting material. This fraction had an acid number of 325, therefore consisting mainly of carboxystearic acid. The fraction, 13.8 grams, was combined with 68 ml. of anhydrous methanol and 5.3 grams (3.9 ml.) of dimethyl sulfate and heated at reflux temperature for 42 hours. The product was worked up by neutralizing the dimethyl sulfate with aqueous sodium carbonate solution in the cold and extracting with ether. (In larger preparations, from one half to two thirds of the alcohol was distilled off before neutralization and dilution, thus increasing the efficiency of the ether extraction.) Distillation of 9.4 grams of the methyl esters from an alembic flask yielded 5.8 grams of a clear, mobile amber liquid, B.P. 146–148° C. (0.35 mm.), $n_D^{30}$ 1.4465.

*Analysis.*—Calcd. for $C_{21}H_{40}O_4$: C, 70.7; H, 11.3; molar refractivity, 102.8. Found: C, 70.6; H, 11.3; molar refractivity, 102.6.

From the chemical analyses, infrared spectra, and gas-liquid chromatography showing several closely related major components it is concluded that the product is a mixture of insomers which would be expected from esterification of the product of Formula I.

Methyl esters of carboxyoctadecanol, carboxylated methyl ricinoleate and carboxylated linoleic acid (Examples 15 to 17, respectively) were prepared in a manner similar to that described for esterification of carboxystearic acid. Esterification of these other branched chain carboxylic acids also takes a long time. The long time

TABLE II.—CHARACTERISTICS OF CRUDE REACTION PRODUCTS

| Example No. | Starting Material | Yield,a Gms. | Acid No. | | Sapon. No. | | Iodine No. | | Percent Hydroxyl | |
|---|---|---|---|---|---|---|---|---|---|---|
| | | | Calcd. | Found | Calcd. | Found | Calcd. | Found | Calcd. | Found |
| 9 | Oleic acid | 32 | 342 | 297 | 342 | 305 | 0 | 2 | | |
| 10 | Oleyl alcohol | 33 | 178 | 135 | 178 | 138 | 0 | 5 | 5.4 | 4.8 |
| 11 | Methyl ricinoleate | 29 | 157 | b 217 | 313 | 319 | 0 | 19 | 4.7 | 1.4 |
| 12 | Linoleic acid | 32 | 344 | c 275 | 344 | 306 | 78 | 48 | | | a Yield based on 30 gms. of starting materials.
b Calculated values are for:

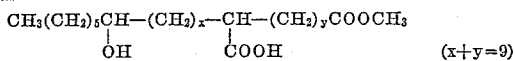

High acid number is probably due to partial hydrolysis of methyl group.
c Calculated values are for:

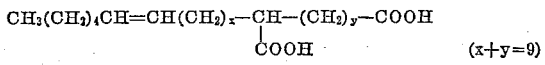

The reduction of the iodine number from that of the starting material also indicates the extent of the reaction. The saponification number of the products obtained from oleic acid and oleyl alcohol are essentially the same as required for complete esterification provides chemical evidence for a branched carboxyl group, as it is well known that such structures behave in this way. Characteristics of these methyl esters are presented in Table III.

TABLE III.—CHARACTERISTICS OF PURIFIED PRODUCTS

| Ex. No. | Compound | Boiling Point | | Carbon, Percent | | Hydrogen, Percent | | $n_D^{30}$ | $d^{30}$ | Molecular calcd. | Refraction Found |
|---|---|---|---|---|---|---|---|---|---|---|---|
| | | °C. | mm. | Calcd. | Found | Calcd. | Found | | | | |
| 9 | Carboxystearic acid | 200–201 | 0.45 | 69.5 | 69.4 | 11.1 | 11.7 | 1.4615 | 0.9726 | 93.5 | 92.8 |
| 13 | Dimethyl ester of carboxystearic acid | 146–148 | 0.35 | 70.7 | 70.6 | 11.3 | 11.3 | 1.4465 | 0.9281 | 102.8 | 102.6 |
| 14 | Dibutyl ester of carboxystearic acid | 183–185 | 0.40 | 73.6 | 73.4 | 11.6 | 11.8 | 1.4465 | 0.9033 | 130.6 | 130.1 |
| 15 | Methyl ester of carboxyoctadecanol | 153–155 | 0.45 | 73.1 | 73.0 | 12.3 | 12.3 | 1.4535 | 0.9095 | 98.0 | 97.7 |
| 16 | Methyl ester of carboxylated methyl ricinoleate.[a] | 161–162 | 0.40 | 70.6 | 69.2 | 10.7 | 10.7 | 1.4530 | 0.9628 | 96.0 | 95.6 |
| 17 | Methyl ester of carboxylated linoleic acid.[a] | 160–161 | 0.40 | 70.6 | 68.7 | 10.7 | 10.7 | 1.4530 | 0.9699 | 96.0 | 94.9 |

[a] Percent C, percent H and molecular refraction calculated for

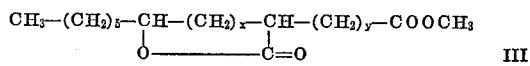

(x+y=9; x probably=1 or 2)

The di-n-butyl ester of carboxystearic acid was prepared either by direct esterification or by ester interchange from the dimethyl ester. In direct esterification, it was necessary to elevate the boiling point in order to obtain complete reaction. Cymene was used for this purpose, but it made the recovery of the product difficult.

*Example 14*

The ester interchange reaction was carried out in the following way. To 33.5 g. of methyl esters (acid number 6.3) prepared from crude carboxystearic acid (acid number 310) was added 142 ml. of n-butanol with which 0.42 g. of metallic sodium had been reacted, and the mixture refluxed for 25 hours. In order to determine when the interchange was complete, the methanol evolved was removed and measured. For this purpose a 1 x 20" fractioning column packed with Raschig rings was used. The product was worked up by pouring the reaction mixture into dilute hydrochloric acid and extracting with ether. After washing the ether layer free of acid it was dried over sodium sulfate, filtered, and the ether was then evaporated, yielding 40.9 g. of crude dibutyl esters having an acid number of 10.7. The acidity of the crude dibutyl esters was neutralized with potassium hydroxide, and the product was vacuum distilled.

The distilled dibutyl esters of carboxystearic acid obtained by the two methods of preparation had the same properties cf. (Table III.)

Neither the methyl or butyl ester could be completely hydrolyzed by refluxing with dilute alcoholic potassium hydroxide for eight hours. This is additional chemical confirmation of a branched carboxylic ester group.

While not illustrated by specific examples it is readily apparent that other esters can be prepared by employing ethanol, propanol, or other higher boiling alkanols in the procedure of Example 14 in place of butanol.

The structural similarity among the methyl esters of the carboxylated products was very marked when the infrared spectra were compared. Confirmation of side chain carboxylation is present in all instances, and on the basis of further infrared spectra evidence, carboxylation of oleyl alcohol according to the present invention, followed by esterification, gives a product of the Formula II

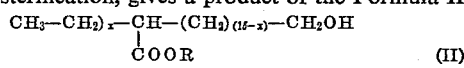  (II)

wherein $x$ is 6 to 9 and R is an alkyl group.

The apparent anomaly shown in Table II and III in respect to the structure of the product obtained by carboxylation of methyl ricinoleate is clarified by study of analytical data and infrared spectra of methyl esters, leading to the conclusion that the crude reaction product is a mixture of

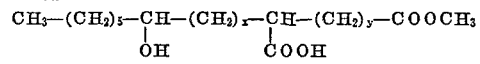

and

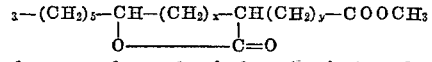

wherein the sum of $x$ and $y$ is 9 and $x$ is 1 or 2.

The unsaturation still present in the crude carboxylated linoleic acid acid is not due to unreacted linoleic acid, as shown by alkaline isomerization. The ultraviolet absorption spectrum of the isomerized and unisomerized samples are the same. The unsaturation, therefore, must be in an unsaturated dicarboxylic acid.

A comparison of the chemical and physical data obtained on the distilled methyl esters of carboxylated linoleic acid with those of the distilled methyl esters of carboxylated methyl ricinoleate (Table III) shows a close similarity. The infrared spectra of the two products are essentially identical. The methyl esters of carboxylated methyl ricinoleate and of linoleic acid are, therefore, identical and may be represented by the Formula III $$CH_3-(CH_2)_5-CH-(CH_2)_x-CH-(CH_2)_y-COOCH_3$$
$$\quad\quad\quad\quad\quad | \quad\quad\quad\quad |$$
$$\quad\quad\quad\quad\quad O\text{———————}C=O \quad\quad\quad III$$

wherein the sum of $x$ and $y$ is 9 and $x$ is 1 or 2.

The carboxylation of long carbon chain olefinic compounds according to the present invention enhances their functional properties for use in the manufacture of alkyd resins, polyesters and polyamides and other polymer applications, or when fully esterified, they can be used as plasticizers or functional fluids such as synthetic lubricants and hydraulic fluids.

We claim:

1. A process for introducing a carboxyl group into oleyl alcohol comprising dispersing carbon monoxide, at substantially atmospheric pressure, in sulfuric acid containing about from 2 to 7% water, combining calculated amounts of oleyl alcohol and said sulfuric acid to provide a liquid phase having a ratio of at least about 3 moles of water to 1 mole of oleyl alcohol, and, at a temperature of about from 10 to 20° C., contacting the oleyl alcohol in liquid phase with carbon monoxide at about atmospheric pressure to introduce a carboxyl group at the double bond of the oleyl alcohol, and separating the carboxylic acid derivative from the reaction mixture.

2. A compound having the formula

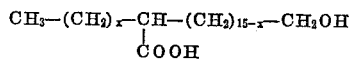

wherein $x$ is an integer from 6 to 9.

3. The compound of claim 2 wherein $x$ is 7.
4. The compound of claim 2 wherein $x$ is 8.

References Cited by the Examiner

UNITED STATES PATENTS

| 2,831,877 | 4/58 | Koch | 260—413 |
| 2,911,422 | 11/59 | Ercoli | 260—413 |
| 3,047,622 | 7/62 | Kurhajec et al. | 260—413 |

CHARLES B. PARKER, *Primary Examiner.*

ABRAHAM H. WINKELSTEIN, *Examiner.*